United States Patent [19]

Mizuno

[11] Patent Number: 4,665,739

[45] Date of Patent: May 19, 1987

[54] SURFACE ROUGHNESS MEASURING INSTRUMENT

[75] Inventor: Satoshi Mizuno, Kawasaki, Japan

[73] Assignee: Mitutoyo Mfg. Co., Ltd, Tokyo, Japan

[21] Appl. No.: 757,832

[22] PCT Filed: Apr. 10, 1985

[86] PCT No.: PCT/JP85/00181

§ 371 Date: Jun. 27, 1985

§ 102(e) Date: Jun. 27, 1985

[87] PCT Pub. No.: WO85/04707

PCT Pub. Date: Oct. 24, 1985

[30] Foreign Application Priority Data

Apr. 10, 1984 [JP] Japan .................. 59-71336
Apr. 10, 1984 [JP] Japan .................. 59-71337
Apr. 10, 1984 [JP] Japan .................. 59-71338
Apr. 10, 1984 [JP] Japan .................. 59-71339

[51] Int. Cl.$^4$ .............................. G01B 5/28
[52] U.S. Cl. .................... 73/105
[58] Field of Search ............... 73/105; 364/554, 556, 364/550

[56] References Cited

U.S. PATENT DOCUMENTS

| 2,396,394 | 3/1946 | Shaw | 73/105 |
| 2,397,923 | 4/1946 | Coss | 73/105 |
| 3,720,818 | 3/1973 | Spragg et al. | 73/105 |
| 3,795,132 | 3/1974 | Huling et al. | 73/105 |
| 4,084,324 | 4/1978 | Whitehouse | 73/105 |
| 4,106,333 | 8/1978 | Salje et al. | 73/105 |
| 4,133,204 | 1/1979 | Mittleman | 73/105 |
| 4,200,986 | 5/1980 | Ackerman et al. | 73/105 |
| 4,573,131 | 2/1986 | Corbin | 73/105 |

FOREIGN PATENT DOCUMENTS 58-2361 1/1983 Japan .
59-30008 2/1984 Japan .

OTHER PUBLICATIONS

"Waikon+Sensor Katsuyo Nyumon" by Nishino Satoru.

Primary Examiner—Stewart J. Levy
Assistant Examiner—Robert R. Raevis
Attorney, Agent, or Firm—Flynn, Thiel, Boutell & Tanis

[57] ABSTRACT

A surface roughness measuring instrument wherein an analogue output signal from a displacement detector (32) for electrically detecting a turning displacement of a measuring arm (5) is converted into a digital signal, and this output signal is interpreted to thereby provide measure of surface roughness of a work (18) to be measured. This surface roughness measuring instrument divides a length to be measured, which is set by a setter (42) by a number of samplings N, i.e. $2^n$, which are arranged equidistantly, and includes a timing circuit (40) for sampling-controlling an analogue/digital converter (39) at the times of samplings.

7 Claims, 11 Drawing Figures

SURFACE ROUGHNESS MEASURING INSTRUMENT

TECHNICAL FIELD

This invention relates to a surface roughness measuring instrument.

BACKGROUND TECHNIQUES

Nowadays, necessity has been voiced more and more for improvements in accuracy of the surface roughness measuring instrument wherein a fine displacement of a contact element brought into contact with the surface of a work to be measured is detected as an electric signal and this electric signal is processed in a predetermined manner to measure a surface roughness of the work.

With the measuring instrument of the type described, as a method of processing the electric signal thus detected, an analogue type method for directly integrating an analogue output signal from a displacement signal has heretofore been widely utilized. However, along with the progress in the electronic techniques in recent years, a digital type method of analogue-digitally converting the analogue output signal into a digital signal and digitally processing the same has been proposed.

When the digital type method is adopted, in general, the number of samplings of the measured data relating to the measuring accuracy poses a problem. When a predetermined length is measured for example, if the number of samplings is small, the intervals between the samplings become longer accordingly, thus lowering the measuring accuracy. In consequence, when the number of samplings is increased, a satisfactory measuring accuracy can be obtained. However, an increased number of samplings requires a high class measuring instrument of a high response speed type for example, so that economical restriction is imposed on this case.

Such being the case, to relieve the burden on the electric circuit, there has been proposed a method of such a type that, in accordance with the measuring length (L) of the work, a speed of a stylus relative thereto is changed with the speed of processing the sampling being made constant. However, by this method, the number of samplings per unit length is decreased with the increase of the measuring length (L), thus presenting the disadvantages that the larger the measuring length is, the lower the measuring accuracy becomes, and moreover, it is extremely difficult to strictly change the speed of the stylus relative to the measuring length (L).

Therefore, the present invention has been developed to obviate the above-described disadvantages of the prior art and has as its object the provision of a surface roughness measuring instrument being excellent as viewed from the standpoint of accuracy and economics, and high in practicability.

SUMMARY OF THE INVENTION

To this end, the arrangement of the present invention features that, in a surface roughness measuring instrument wherein the measuring instrument comprises a main body of measuring instrument, a detection head including a measuring arm rotatably supported at one end thereof by the main body and provided thereon with a contact element at a position a predetermined distance apart from a fulcrum for the rotation, a displacement detector for detecting a turning displacement of the measuring arm as an electric signal and a signal processing section for processing an output signal from the displacement detector in a predetermined manner, whereby a surface roughness of a work to be measured which contacts the contact element or moving relative thereto is measured, such an arrangement is adopted that the displacement detector is made to be of an analogue signal output type, an analogue/digital (A/D) converter is provided for converting an analogue output signal thus obtained into a digital signal, and the digital output signal is processed in a predetermined manner by an operational circuit, to thereby calculate a surface roughness of the work to be measured, while, any set measuring length is divided by the number of samplings N, i.e. $2^n$ which are arranged equidistantly, a timing circuit is provided for sampling-controlling the A/D converter to convert analogue output signals at every sampling times into digital signals.

PREFERRED EMBODIMENT FOR WORKING THE INVENTION

Figure 1:
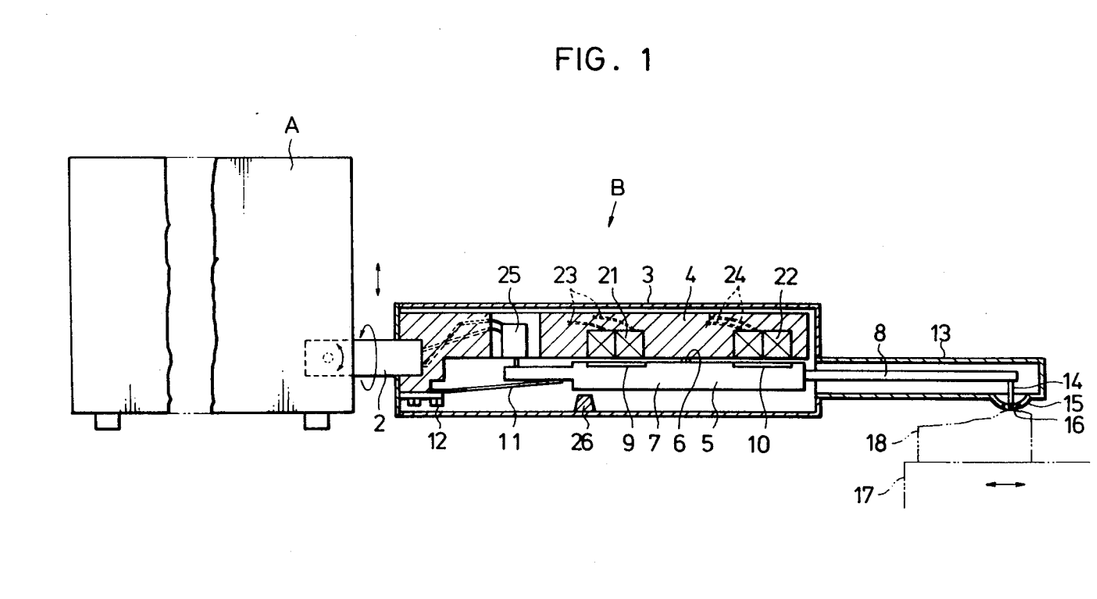
FIG. 1 is a sectional view showing the surface roughness measuring instrument.

FIG. 1 shows a section of a surface roughness measuring instrument of this embodiment. In FIG. 1, a detection head B is rockingly supported by a main body A of the measuring instrument through a movable shaft 2. The movable shaft 2 is secured to the main body A in a manner to be positionally adjustable in the rotating and vertical directions for the purpose of accommodating a support member 4, the outer surface of which is covered by a case 3, to the size, contour and the like of the work, and detachably mounted to the main body A, so that the detection head B is replaceable with a new one, to accommodate itself to the contour and the like of the work. On the other hand, a rod-shaped measuring arm 5 is rockingly mounted to the undersurface of the support member 4 through a cross spring 6.

The measuring arm 5 is constituted by a first arm 7 rockingly supported at the substantially central portion thereof by the support member 4 through the cross spring 6 and a second arm 8 connected to one end of this first arm 7. The first arm 7 is provided thereon with dielectrics 9 and 10 at positions equidistantly apart from the rocking fulcrum position, i.e. the position of the cross spring 6 in directions opposite to each other, and rotatably biased in the clockwise direction in the drawing by a compression spring 11 formed of a leaf spring. The compression spring 11 can be adjusted in its resilient force by an adjusting screw 12.

The second arm 8 is housed in a protection case 13 integrally protruded from one end of the case 3, and provided at the forward end portion thereof with a contact element 14 perpendicular to an axial line of the second arm 8. A semispherical guide portion 15 is formed at the side surface of the forward end portion of the protection case 13, which is formed with an opening 16 for allowing the contact element 14 of the second arm 8 to project to the outside. With this arrangement, for example, after the contact element 14 is brought into contact with a surface to be measured of the work 18 rested on a table 17, if the table 17 is moved in an arrow-marked direction in the drawing, then the measuring arm 5 is rocked about the cross spring 6 as being the fulcrum in accordance with the surface roughness of the work 18.

On the other hand, in the support member 4, a pair of detection coils 21 and 22 are embedded at positions opposed to the dielectrics 9 and 10 of the first arm 7, being spaced apart from the dielectrics 9 and 10, and a holder 25 for holding the measuring arm 5 in a predetermined posture is provided at a position opposed to the other end of the first arm 7. The detection coils 21 and 22 are led to a signal processing section C in the main body A by lead wires 23 and 24, respectively, passing through the movable shaft 2. When the holder 25 is actuated in response to a signal from the main body A, the measuring arm 5 is adapted to be held in a posture where the other end of the measuring arm 5 is urged against a projection 26 in the case 3. With this arrangement, the contact element 14 of the measuring arm 5 is housed in the protection case 13. Additionally, the support member 4, measuring arm 5, contact element 14, dielectrics 9 and 10, and detection coils 21 and 22 constitute the detection head B.

Figure 2:
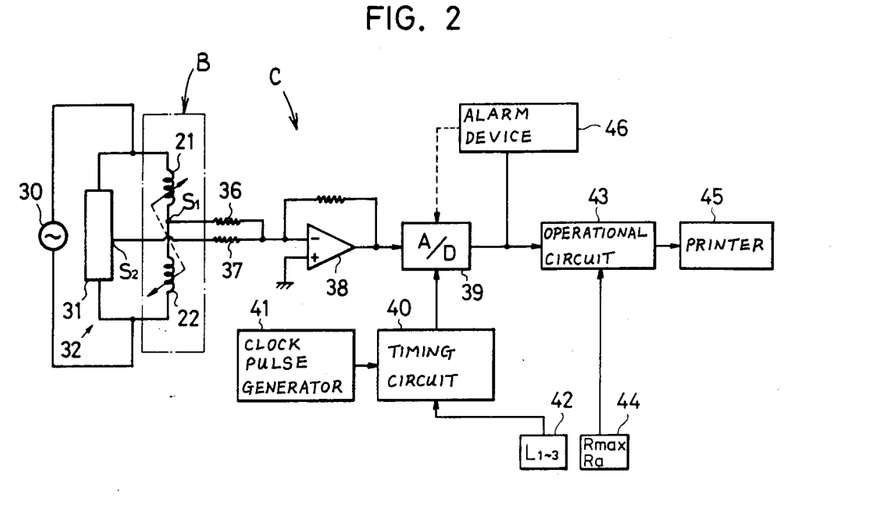
FIG. 2 is a block diagram showing a circuit arrangement.
Figure 3:
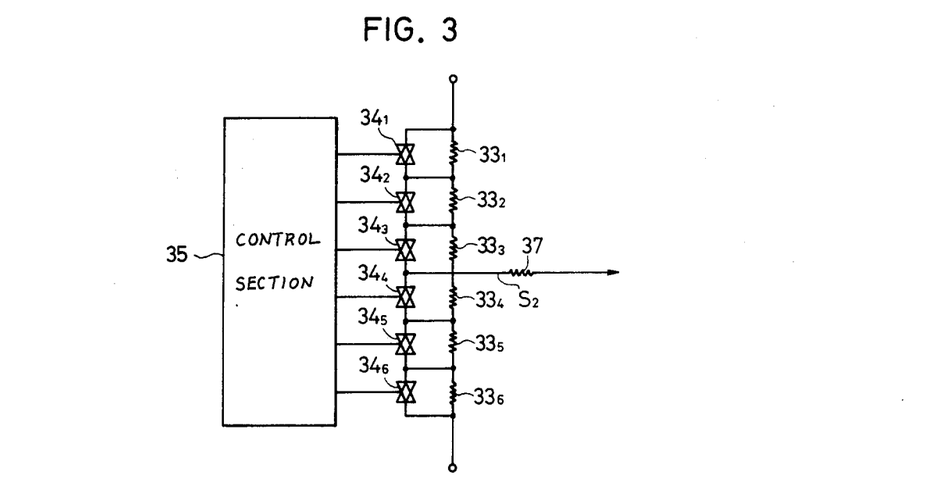
FIG. 3 is a block diagram showing an analogue switch type variable resistor.

FIG. 2 shows the circuit arrangement in the main body A. In FIG. 2, the pair of detection coils 21 and 22, and an analogue switch type variable resistor 31 constitute a bridge circuit 32 as being an analogue signal output type displacement detector for detecting a turning displacement of the measuring arm 5 as an electric signal, and input and output lines of this bridge circuit 32 are connected to the signal processing section C. As shown in FIG. 3, the analogue switch type variable resistor 31 successively, serially connects a plurality of resistors $33_1$-$33_6$ to one another, connects analogue switches $34_1$-$34_6$ in parallel to the resistors $33_1$-$33_6$, and these analogue switches $34_1$-$34_6$ are controlled by a control section 35. With this arrangement, it can be previously set that, when the measuring arm 5 is in a certain posture, a phase of an output signal $S_1$ at the connected point between both detection coils 21 and 22 is inverse to a phase of an output signal $S_2$ at the connected point between the resistors $33_3$ and $33_4$. In consequence, when the measuring arm 5 is displaced from the condition thus set due to a surface roughness of the work 18, inductances of the respective detection coils 21 and 22 are varied due to a change in gap between the dielectrics 9, 10 and the detection coils 21, 22, with the result that variations in the inductances are outputted as measured values through the bridge circuit 32.

The outputs from the bridge circuit 32, i.e. the output signal $S_1$ at the connected point of the both detection coils 21, 22 and the output signal $S_2$ at the connected point between the resistors $33_3$, $33_4$ are inputted to an operational amplifier 38, respectively, through resistors 36 and 37, where the output signals are formed into a composite one, which is then delivered to the A/D converter 39. At this time, when the output signal $S_1$ and the output signal $S_2$ are inverse in phase to each other, both signals $S_1$ and $S_2$ are offset by each other, so that an output from the operational amplifier 38 becomes zero.

Each time conversion command pulses are given from a timing circuit 40, the A/D converter 39 converts an output signal from the operational amplifier 38 into a digital signal. The timing circuit 40 is adapted to count clock pulses from a clock pulse generator 41 and give the conversion command pulses to the A/D converter 39 each time the count number reaches a count number corresponding to measuring or sampling lengths $L_1$–$L_3$, which are set by a setter 42 for setting the measuring or sampling lengths. Here, count numbers different from one measuring length to another are set such that measuring lengths of three types set by the setter 42 for setting the measuring lengths ($L_1$=0.25 mm, $L_2$=0.8 mm and $L_3$=2.5 mm, as provided for by JIS (Japanese Industrial Standards)) are equally divided in accordance with the number of samplings N, respectively. Furthermore, the number of samplings N is preset such that, when the surface roughness is measured according to the maximum height (Rmax) method, the number of samplings is 1024 which is $2^{10}$ and, when the surface roughness is measured according to the center line mean roughness method (Ra), the number of samplings is 512 which is $2^9$. With this arrangement, for any measuring or sampling length, which is set by the setter 42, digital signals N obtained by equally dividing the measuring length by the number of samplings N are given to the operational circuit 43 from the A/D converter 39.

The operational circuit 43 calculates the digital signals from the A/D converter 39 in accordance with the maximum height (Rmax) operation command or the center line mean roughness (ra) operation command and the result is recorded by a printer 45. If the digital signals from the A/D converter 39 exceed an excessively high preset value, such for example as a value which is scaled out by the printer 45, then an alarm is given by an alarm device 46. In the case of the maximum height (Rmax) method, the answer can be obtained by a difference between the maximum value and the minimum value out of the data N given by the A/D converter 39. Furthermore, in the case of the center line mean roughness (Ra) method, the answer can be obtained by:

$$R_a = \frac{1}{L} \int_O^L |f(x)| dx$$

In consequence, according to this embodiment, the respective measuring or sampling lengths are equally divided by the preset number of samplings N, the signals at the times of the samplings are converted into the digital signals and the surface roughness of the work is sought therefrom on the basis of the digital signals, so that the number of samplings can be made constant irrespective of the measuring or sampling length and without changing the speed of relative movement between the measuring instrument and the work, thereby enabling an avoidance of lowered measuring accuracy due to the decreased number of samplings.

In passing, the maximum height 0.38 μm is made to be a true value when the measuring or sampling lengths $L_1$=0.25 mm, $L_2$=0.8 mm and $L_3$=2.5 mm, as provided for by JIS, are equally divided in accordance with the number of samplings N=16000 under the maximum height (Rmax) method. The following table shows specific accuracies of the maximum heights to the true value when the number of samplings N are varied to 8000, 4000, 2000 and 1000. Additionally, lapping pieces produced by the Tokyo-toritsu Kogyo Gijutsu Senta (Tokyo Industrial Technology Center) are used as testpieces.

|      | MEASURING LENGTH |        |        |
| ---- | ---------------- | ------ | ------ |
| N    | 0.25 mm          | 0.8 mm | 2.5 mm |
| 8000 | 0.80%            | 0.08%  | 0.00%  |
| 4000 | 1.40%            | 0.40%  | 0.08%  |
| 2000 | 4.80%            | 1.00%  | 0.23%  |
| 1000 | 5.80%            | 2.50%  | 0.75%  |

According to this table, it is understandable that, with every measuring or sampling length, the specific accuracies of the maximum heights to the true value, namely, the maximum height when the number of samplings N=16000 are increased with a decrease in the number of samplings N. However, even when the measuring length $L_1=0.25$ mm and the number of samplings N=1000, the true value when $L_1=0.25$ mm is 0.38 μm. Hence, the error is 0.38 μm×0.058=0.022 μm, which does not pose a problem as viewed from the standpoint of accuracy in the practical sense. Furthermore, according to the center line mean roughness (Ra) method, the answer is obtained by:

$$R_a = \frac{1}{L} \int_0^L |f(x)| dx$$

Hence, the number of samplings N may be made further smaller, and it is particularly satisfactory only if the number of samplings is N=500 or more. In consequence, no problem is posed as viewed from the standpoint of accuracy in the practical sense when the number of samplings N is made to be 1024 or more in the case of the maximum height (Rmax) method, and the number of samplings N is made to be 512 or more in the case of the center line mean roughness (Ra) method.

Furthermore, in accordance with the measuring or sampling lengths $L_1$, $L_2$ and $L_3$ set by the setter 42, each of these lengths to be set is automatically, equally divided, whereby necessity for adjusting the speed of relative movements is eliminated.

Furthermore, the number of samplings N is made to be $2^n$, whereby the operation can be performed by a shift method, so that the time period for the operation can be shortened, the program can be simplified and the aspect of construction of the hardware can be simplified. This fact leads to an economical advantage, and moreover, to a reduced memory capacity, so that the power consumption can be lowered, and particularly, the measuring instrument is made suitable for being formed into a portable type incorporating therein a battery.

Figure 4:
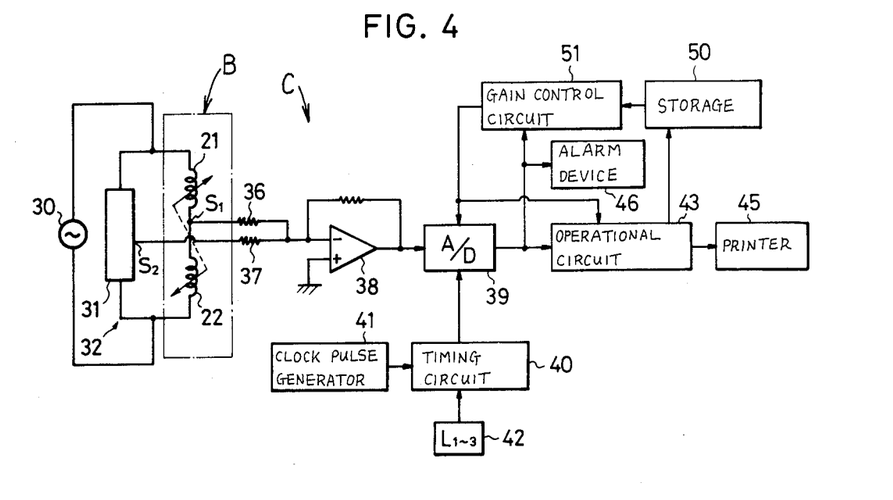
FIG. 4 is a block diagram showing another circuit arrangement different from the aforesaid one.

Additionally, in the foregoing description, the arrangement wherein the result of the operation has been recorded by the printer and the alarm has been given at the time of exceeding the predetermined value, however, such a circuit arrangement as shown in FIG. 4 may be adopted. The operational circuit 43 shown in FIG. 4 causes the printer 45 to successively record the digital signals from the A/D converter 39, seeks a mean line on the basis of the digital signals in accordance with the least squares method, and causes a storage 50 to store an inclination of the mean line. In passing, if the mean line obtained in accordance with the minimum line is $$y = A + Bx \text{ then,} \qquad (1)$$

$$A = \frac{\sum\limits_{i=1}^{n} yi}{n} - B \cdot \frac{\sum\limits_{i=1}^{n} xi}{n} \qquad (2)$$

$$B = \frac{\sum\limits_{i=1}^{n} xi \cdot yi - \frac{\sum\limits_{i=1}^{n} xi}{n} \cdot \sum\limits_{i=1}^{n} yi}{\sum\limits_{i=1}^{n} (xi^2) - \frac{\left(\sum\limits_{i=1}^{n} xi\right)^2}{n}} \qquad (3)$$

where n is the total number of samplings, and Xi and yi are values of the ordinate x and the abscissa y at the time of sampling No. i.

Therefore, the inclination of the mean line can be sought by the equation (3).

Figure 5:
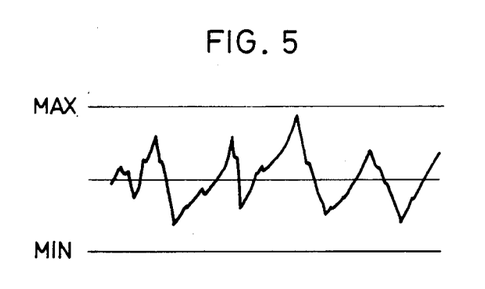
FIGS. 5 to 7 are drawings showing the surface roughnesses.
Figure 6:
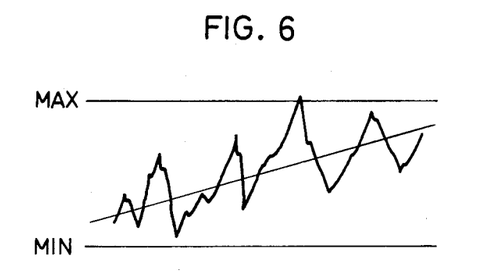
Figure 7:
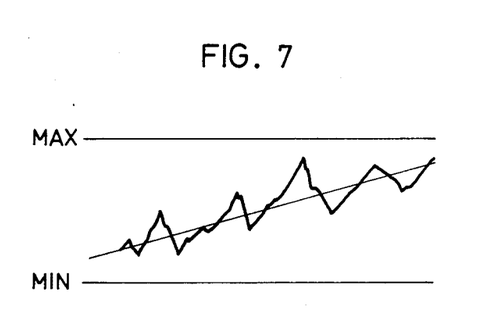

On the other hand, the digital signals from the A/D converter 39 are given to the alarm device 46 and a gain control circuit 51 in addition to the operational circuit 43. When the digital output signals from the A/D converter 39 exceed the excessively high value, for example, the value which is scaled out by the printer 45, the gain control circuit 51 controls a gain of the A/D converter 39 on the basis of the inclination of the mean line stored in the storage 50, namely, a relative inclination angle between the work 18 and the contact element 14 to a reference line of movement. With this arrangement, for example, when a relative inclination angle between the work 18 and the contact element 14 to the reference line of movement is zero, the measured value in FIG. 5 is shown, whereas, when the measured value is scaled out as shown in FIG. 6 by the inclination angle at the time of relative movement, a correction will be made as shown in FIG. 7 at the succeeding time of measuring.

With the above-described arrangement, the mean line is sought on the basis of the digital signals from the A/D converter 39 by the least squares method, the inclination of the mean line, namely, the relative inclination angle between the work 18 and the contact element 14 to the reference line of movement is stored, and, when the digital signals exceed the preset excessively high value, the gain of the A/D converter 39 is controlled on the basis of the relative inclination angle, so that, in measuring the surface roughness, a proper and accurate measurement can be made with no scale-out. Furthermore, when the measured value is scaled out as described above, the gain is controlled for the preparation of the succeeding measurement, so that controlling the work is not needed and the measurement can be quickly carried out.

Figure 8:
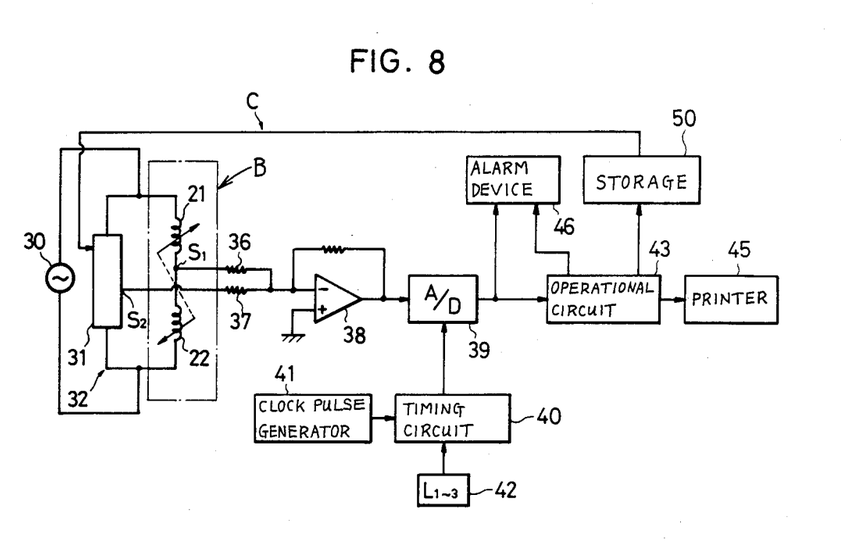
FIG. 8 is a block diagram showing a further circuit arrangement different from the above circuit arrangements.
Figure 9:
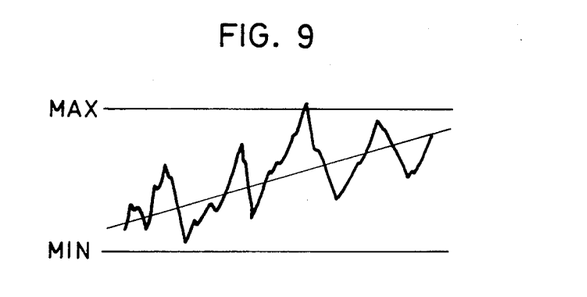
FIGS. 9 and 10 are drawings showing the surface roughnesses.
Figure 10:
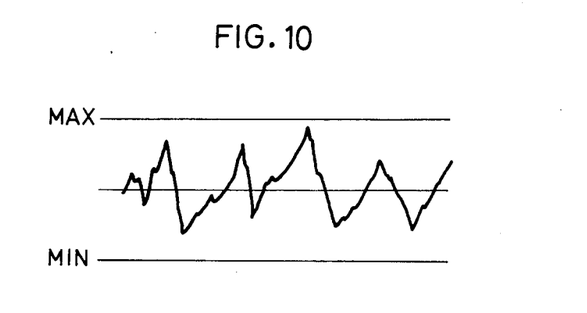

Additionally, the inclination of the mean value stored in the storage 50 may be given to the bridge circuit 32, particularly the control section 35 thereof as a command value as shown in FIG. 8. In this case, the control section 35 controls the analogue switches $34_1$–$34_6$ in a direction in which the inclination given as the command value is eliminated, and controls the values of the resistors $33_1$–$33_6$ continuously variably, whereby the measured value is automatically corrected. When the measured value is scaled out as in FIG. 9 for example, a correction is made as shown in FIG. 10 for the succeeding measurement work.

According to this method, the gain in the measuring instrument is not controlled, so that such an advantage can be added that the measuring accuracy is not lowered.

Figure 11:
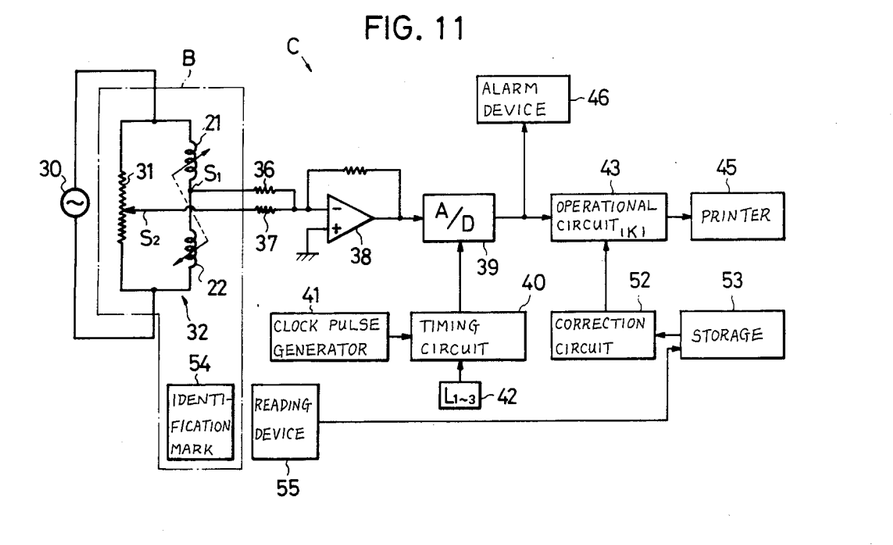
FIG. 11 is a block diagram showing a still further circuit arrangement different from the above circuit arrangements.

Further, in the surface roughness measuring instrument of a detection head replacing type, as shown in FIG. 11, identification marks 54 different from one detection head B to another are attachingly provided on the respective detection heads B, the characteristics of the respective detection heads B are stored in association with the identification marks 54 of the detection heads B, and a device 55 for reading the identification mark 54 of the detection head B each time the detection head B is replaced with a new one is provided in the signal processing section C, so that a constant preset in the operational circuit 43 may be renewed on the basis of the characteristic value associated with the identification mark which has been read.

In this case, a constant K in the operational circuit 43 is automatically renewed by a correction circuit 52 each time the detection head B is replaced. After the detection head B is replaced with a new one, when the identification mark 54 of the detection head B is read by the reading device 55, the correction circuit 52 renews the constant K in the operational circuit 43 on the basis of a characteristic value associated with the identification mark 54 read from the storage 53. In the storage 53, there are previously stored the characteristic values for every identification mark 54 associated with the detection heads B to be replaced. For example, turning displacement values of the measuring arm 5, the characteristic curves of the output signals and the like for the respective detection heads B are previously stored. With this arrangement, after any one of the detection heads B is secured to the main body A, when the identification mark 54 of this detection head B is read by the reading device 55, the characteristic value associated with the identification mark 54 read by the reading device 55 is read out of the storage 53. Then, the correction circuit 52 renews the constant K in the operational circuit 43 on the basis of the characteristic value read out of the storage 53. In short, thereafter, the constant thus renewed is utilized as a correction value during operation.

With the above-described arrangement, such an advantage can be offered that the necessity of matching of the signal processing section C each time the detection head is replaced with a new one is eliminated.

Additionally, the measuring lengths need not necessarily be limited to that of the three types $L_1 = 0.25$ mm, $L_2 = 0.8$ mm and $L_3 = 2.5$ mm as described in the above embodiment, and at least the measuring lengths, which are provided for in JIS, may be brought under study.

Furthermore, as the displacement detector, in addition to the construction of the bridge circuit 32 described in the above embodiment, any one, which can detect a turning displacement of the measuring arm 5 as an analogue signal such for example as a differential transformer, may be adopted.

Further, as for the relative movement between the work 18 and the contact element 14, contrary to the above embodiment, the contact element 14 may be made movable relative to the work 18 to be measured. In this case, such an arrangement may be adopted that a relative movement value therebetween is detected by an encoder or the like for example, in place of the clock pulses from the clock pulse generator 41, and outputs from this encoder are inputted to the timing circuit 40, where the outputs from the encoder are counted in accordance with the measuring lengths, whereby the conversion command pulses may be generated. With this arrangement, it is advantageous in that, even if a relative movement speed therebetween is varied, the number of pulses per unit length is not varied.

As has been described hereinabove, according to the present invention, the number of samplings can be made constant irrespective of the measuring or sampling length and without changing the speed of relative movement between the measuring instrument and the work, and hence, the present invention can provide a surface roughness measuring instrument which is excellent in measuring accuracy, and moreover, inexpensive.

USABILITY IN INDUSTRIES

The surface roughness measuring instrument according to the present invention can be utilized generally in the field of measuring the surface contours of the work to be measured.

What is claimed is:

1. In a surface roughness measuring instrument wherein said measuring instrument comprises a main body, a detection head including a measuring arm rotatably supported at one end thereof by said main body and having a contact element thereon a predetermined distance from a support means supporting said measuring arm for the rotation, a displacement detector means for detecting a turning displacement of said measuring arm and producing an electric output signal and a signal processing section for processing said output signal from said displacement detector means, whereby a surface roughness of a work to be measured which contacts said contact element or moving relative thereto is measured, the improvement comprising wherein said displacement detector means includes an analogue signal producing means responsive to movement of said measuring arm to produce an analogue output signal, an analogue/digital converter means is provided for converting said analogue output signal into a digital signal, an operational circuit means is provided and which is responsive to said digital signal for calculating a surface roughness of said work, set measuring length means is provided for dividing a selected sampling length by a number of samplings N which are equidistantly spaced from one another, a timing circuit means is provided for sampling-controlling said analogue/digital converter means to convert said analogue output signals at selected sampling times into digital signals, and wherein said operational circuit means includes means for seeking a relative inclination angle value between said work and said measuring arm to a reference line of movement in response to output signals of said analogue/digital converter.

2. A surface roughness measuring instrument as set forth in claim 1, wherein said operational circuit means includes means for seeking said relative inclination angle value as a mean line in accordance with a least squares method.

3. A surface roughness measuring instrument as set forth in claim 1, wherein a storage means is provided for storing said relative inclination angle value sought by said operational circuit means and control means for controlling an output signal from said displacement detector means in a direction in which said relative inclination angle value stored in said storage means as a command value is eliminated.

4. A surface roughness measuring instrument as set forth in claim 3, wherein said displacement detector means is an electromagnetic induction type bridge circuit.

5. A surface roughness measuring instrument as set forth in claim 3, wherein said control means controls a resistance in said bridge circuit.

6. In a surface roughness measuring instrument wherein said measuring instrument comprises a main body, a detection head including a measuring arm rotatably supported at one end thereof by said main body and having a contact element thereon a predetermined distance from a support means supporting said measuring arm for the rotation, a displacement detector means for detecting a turning displacement of said measuring arm and producing an electric output signal and a signal processing section for processing said output signal from said displacement detector means, whereby a surface roughness of a work to be measured which contacts said contact element or moving relative thereto is measured, the improvement comprising wherein said displacement detector means includes an analogue signal producing means responsive to movement of said measuring arm to produce an analogue output signal, an analogue/digital converter means is provided for converting said analogue output signal into a digital signal, an operational circuit means is provided and which is responsive to said digital signal for calculating a surface roughness of said work, set measuring length means is provided for dividing a selected sampling length by a number of samplings N which are equidistantly spaced from one another, a timing circuit means is provided for sampling-controlling said analogue/digital converter means to convert said analogue output signals at selected sampling times into digital signals, wherein said detection head is replaceably provided on said main body of said measuring instrument, and wherein:

said operational circuit means includes calculating means for calculating electric signals associated with dimensions of said detection head, which electric signals are outputted from said detection head, by use of a preset constant;

identification marks different from one detection head to another are provided on the respective detection heads;

a mark reading means for automatically reading said identification mark and a further storage means for storing characteristic values of the respective detection heads is provided in said signal processing section; and a correction circuit means is provided for automatically renewing a constant in said signal processing section on the basis of a characteristic value associated with said identification mark stored in said further storage means when said identification mark of said detection head is read by said mark reading means after said detection head is replaced with a new one.

7. A surface roughness measuring instrument as set forth in claim 6, wherein said further storage means detects a characteristic value of a mark reading means connected to said signal processing section, said further storage means automatically storing said characteristic value in association with said identification mark read by said mark reading means.

* * * * *

UNITED STATES PATENT AND TRADEMARK OFFICE
CERTIFICATE OF CORRECTION

PATENT NO. : 4,665,739
DATED : May 19, 1987
INVENTOR(S) : Satoshi MIZUNO

It is certified that error appears in the above-identified patent and that said Letters Patent is hereby corrected as shown below:

Column 9, line 8; change "Claim 3" to ---Claim 4---

Signed and Sealed this

Seventeenth Day of November, 1987

Attest:

DONALD J. QUIGG

*Attesting Officer*  *Commissioner of Patents and Trademarks*